United States Patent [19]

Van Der Piepen

[11] Patent Number: 5,573,635
[45] Date of Patent: Nov. 12, 1996

[54] THIN FILM EVAPORATING DEVICE

[75] Inventor: Rolf Van Der Piepen, Butzbach, Germany

[73] Assignee: Buss AG, Pratteln, Switzerland

[21] Appl. No.: 253,338

[22] Filed: Jun. 3, 1994

[30] Foreign Application Priority Data

Mar. 15, 1993 [DE] Germany .............................. 9303760 U

[51] Int. Cl.$^6$ .................................. B01D 1/06; B01D 1/22
[52] U.S. Cl. ...................... 159/6.1; 159/13.2; 159/27.1; 159/49; 202/173; 202/236; 202/237
[58] Field of Search ...................................... 202/236, 173, 202/237; 159/49, 13.2, 27.1, 6.1, DIG. 8, 26.1; 196/111; 165/115; 203/89

[56] References Cited

U.S. PATENT DOCUMENTS

| | | | |
|---|---|---|---|
| 3,351,119 | 11/1967 | Rosenblad | 202/236 |
| 3,356,125 | 12/1967 | Standiford, Jr. | 202/236 |
| 3,472,304 | 10/1969 | Evkin | 202/236 |
| 3,620,282 | 11/1971 | Newton | 159/13.4 |
| 3,764,483 | 10/1973 | Tleimat | 202/236 |
| 3,875,988 | 4/1975 | Machida et al. | 159/13.2 |
| 4,030,985 | 6/1977 | Barba et al. | 202/236 |
| 4,053,006 | 10/1977 | Tkac et al. | 202/236 |
| 4,810,327 | 3/1989 | Norrmén | 202/236 |
| 5,185,060 | 2/1993 | Yamasaki et al. | 202/236 |
| 5,246,541 | 9/1993 | Ryham | 202/197 |

Primary Examiner—Virginia Manoharan
Attorney, Agent, or Firm—Bachman & LaPointe, P.C.

[57] ABSTRACT

A thin film evaporating device includes a housing defining a space for receiving a plurality of elongated tubular evaporators. An inlet is associated with the housing for feeding a flowable heating medium to the space for heating the plurality of elongated tubular evaporators.

5 Claims, 2 Drawing Sheets

THIN FILM EVAPORATING DEVICE

BACKGROUND OF THE INVENTION

The present invention relates to a thin film evaporating device and, more particularly, a thin film evaporating device comprising a housing defining space for receiving a plurality of elongated tubular evaporators.

Thin film evaporators of the type described above may be used for the concentration of flowable, temperature-sensitive, and/or coating-forming materials. All of them are based on the principle of creating a thin product layer in the interior of a heated cylinder by means of a rotating rotor, so that the heat supplied to the cylinder wall leads to evaporation of the portion of the liquid with a low boiling point, the vapor only having to travel a short distance through the product. With this arrangement it is possible to concentrate mixtures of liquids with different boiling points, and also liquids containing solids. The rotor has vanes which are separated from the heated inner wall of the evaporator by a gap of only a few millimeters. Alternatively, the cylinder is equipped with movable wiper blades, so that the product running over the heated inner wall of the evaporator may be kept in a thin product film. Up to now the evaporator has been heated by making the tubular part double-walled, the intermediate space between the inner wall and the outer wall then being supplied with a heating medium, for example steam. The throughput capacity of evaporators of this type may be controlled only within narrow limits.

SUMMARY OF THE INVENTION

Accordingly, it is the principle object of the present invention to provide a thin film evaporator of relatively simple construction which is economical to operate and repair.

The foregoing object is achieved by way of the invention wherein each of a plurality of evaporators provided with a rotor are mounted one beside an other in a common housing or heating jacket which receive a flowable heating medium. Each evaporator is connected with a separate product supply line, and the concentrate and vapor outlets of the evaporators open into a separating space sealed off from the heating jacket from which the concentrate and vapor are drawn off separately. A thin film evaporating device made in this way makes it possible to manufacture types of evaporators having high throughput capacities less expensively by means of locating several small evaporators in a common heating jacket or having since, according to the modular system, two or more small evaporators with corresponding rotors and drives may be arranged one beside the other. A further advantage consists in the fact that even large types of evaporators have a heat transfer which is just as good as small evaporators, since the wall thickness of the heating wall always remains equally thin as a result of the small pipe diameter of the evaporator tube bodies used. A further advantage consists in the fact that load variations resulting from switching the product feed on and off to individual evaporator bodies may be equalized in a simple way. A further advantage of the design consists in the fact that, as compared with conventional thin film evaporators of the same capacity, it is possible to reduce the height of installation of the rotors and thus the space requirement above the thin film evaporating devices. Instead of a large, long rotor, only small light rotors need to be handled during maintenance and repair work, so that also only lighter lifting equipment has to be available.

In a preferred embodiment of the present invention the heating jacket has a circular cross-section. This makes it possible to use standard pipes for the heating jacket, so that costly special parts can be avoided. A further advantage consists in the fact that a commercially available standard pipe can be used.

In a further advantageous embodiment of the present invention it is provided that the concentrate and vapor outlets of the individual evaporators open at least into one collecting funnel located in a separating space. This results in a further simplification of the entire device.

Another advantageous embodiment of the present invention provides for the vapor outlet of the separating space to be located above the opening of the collecting funnel in the separating space. This results in a clear separation of the concentrate from the vapor, especially in the case of the concentration of liquid mixtures.

It is particularly advantageous if the separating space is subdivided by at least one separating wall into separate subspaces for receiving distillate produced in each tube. This offers the advantage of operating a thin film evaporating device in series in several stages. The concentrate precipitating in the first evaporator body is delivered as a preliminary concentrate to the next evaporator in the same heating jacket. The vapors obtained may be drawn off and concentrated either together or separately. This configuration also offers the possibility of supplying the evaporator pipes with the product differently.

A further advantageous embodiment of the present invention provides that an adjustable pressure holding valve be coordinated with the product supply of an evaporator. This makes it possible to have a separate product delivery to each evaporator from a central supply line, the pressure holding valves insuring that the individual evaporators are supplied uniformly with the product to be concentrated. Also, if another shut-off valve is mounted in each product line of an evaporator, then there is the possibility of equalizing production-caused load variations by means of switching on and off the product feed to individual evaporators so that it is possible to have graduated controllability within a wide range.

A further embodiment of the present invention provides that the space enclosed by the heating jacket be separated from the separating space at its lower end by means of an end plate through which the sealed tubular evaporators pass. This arrangement has the advantage that the tubular evaporators may be welded into the end plate pressure-tight.

In a further embodiment of the present invention it is provided that the space enclosed by the heating jacket has an upper end plate which is provided with sealed-off, openable passages for the rotors. Also in this case the tubular evaporators are welded into the passages pressure-tight with the end plate. In particular this arrangement has the advantage that, after separation from the drive motors, the rotors may be removed individually from the evaporators for maintenance or repair, without needing to open the heating space enclosed by the heating jacket for this. In each case it is very much easier to inspect the very much smaller gaskets before the assembly.

BRIEF DESCRIPTION OF DRAWINGS

The invention is to be explained in greater detail by means of schematic drawings of a specific embodiment wherein.

DETAILED DESCRIPTION

Figure 1:
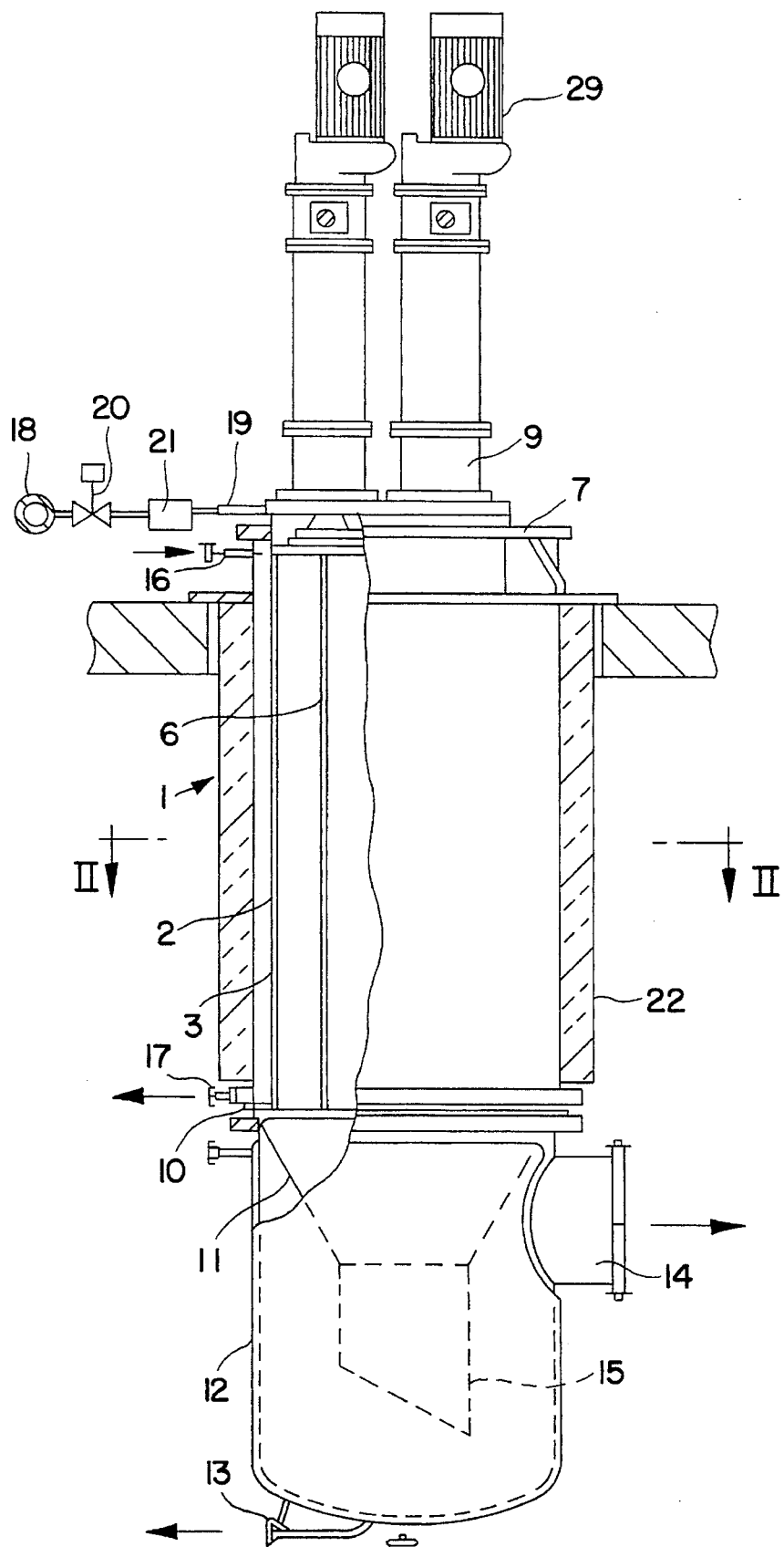
FIG. 1 shows a partial vertical section through a thin film evaporating device.
Figure 2:
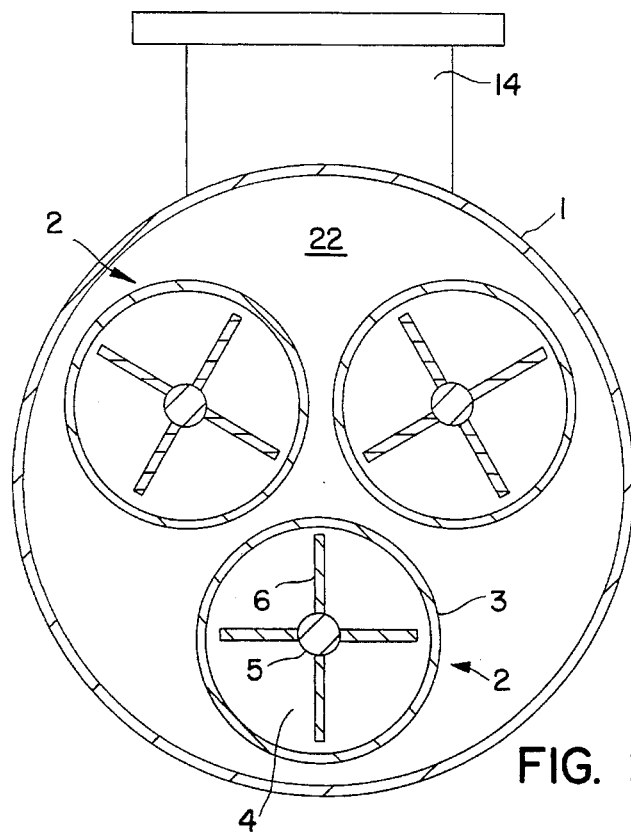
FIG. 2 shows a horizontal section along the line II—II in FIG. 1.

As FIGS. 1 and 2 show, several evaporators 2 are arranged one beside the other in a heating jacket or housing 1. As the cross-section shown in FIG. 2 indicates, in each case the evaporators essentially are formed by cylindrical tubes 3, in which there is a rotor 4, which has a shaft 5 with radially oriented vanes or wiper blades 6. The shaft is directed upward out of the heating jacket or housing 1 which is provided with an upper end plate or wall 7. The shafts 5 in each case pass through a sealing housing 9 in the usual way and are connected with an electric drive motor 29.

The lower end of the heating jacket 1 is closed by means of an end plate or lower wall 10 through which the sealed-off pipes 3 pass. The lower openings of the pipes 3 of the individual evaporators 2 in this case open via a collecting funnel 11 into a separating space 12, the lower end of space 12 is provided with a concentrate outlet 13 and the upper region of space 12 with a vapor outlet 14. The collecting funnel 11 in this case has a tubular extension 15 which projects near to the bottom of the separating space 12 so that there is a sufficient turning distance for the vapor to be drawn off via outlet 14.

Space 22, enclosed by the heating jacket 1, as well as the upper end plate 7 and the lower end plate 10, receiver pipes 3 of the evaporator bodies 2. Space 22 is supplied with a flowable heating medium, for example steam, which is fed into the space through an upper supply line 16 and is removed through a lower outlet 17.

The product to be concentrated is supplied through a collecting funnel 18, from which a separate product line 19 branches to each evaporator body 2. In each case a shut-off valve 20 and a pressure holding valve 21 is installed in the product supply line 19, so that each of the evaporators may be shut off from the product supply. With respect to the pressure holding valves 21 located in each case in the product supply lines 19, it is necessary to make sure that all three evaporation bodies are supplied uniformly with the product to be concentrated. In this case the product to be concentrated is introduced into the inner space of the evaporation bodies 2 so that it runs down the inner wall of the pipes 3 as a uniform film and is held on the inner wall during the rotation of the rotors 4. The outside of the heating jacket 1 maybe provided with a heat insulation 22.

Figure 3:
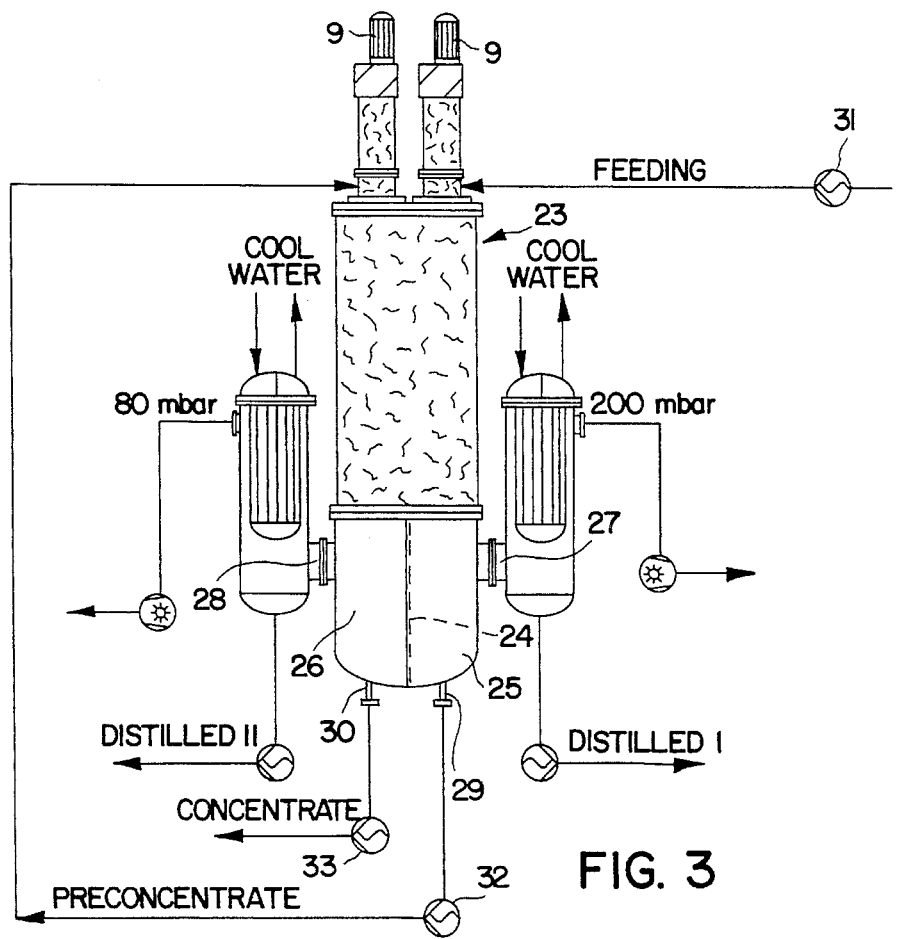
FIG. 3 shows a configuration with a subdivided separating space.

In the case of the arrangement shown in FIG. 3, the thin film evaporating device 23 essentially has the same design as is described with reference to FIGS. 1 and 2, but with only two evaporators, the drives 9 of which are visible. With reference to FIG. 3, the separating space 12 is subdivided by a partition 24 so that there are two separate subzones 25 and 26 completely separated from one another. Each subzone is provided with its own vapor outlets 27 and 28 respectively, and its own concentrate outlets 29 and 30, respectively. The product is supplied to the first evaporator through a supply pump 31. The concentrate produced in the first evaporator is removed from the subspace 25 as a preliminary concentrate through a feed pump 32 and supplied to the second evaporator in series. The finished concentrate is removed from the separating space 26 through the feed pump 33 after passing through the system.

In the case of the arrangement shown in FIG. 3, the vapors also are removed separately from the subspaces 25 and 26, respectively, and removed as separate distillates after condensation. As a result of the separation of the two evaporation bodies on the outside, it is possible to operate the two evaporators in different regimes. Only the heating is the same in the case of the two. Thus it is possible to operate two or more evaporators both in series, as is shown in FIG. 3, as well as in parallel.

Depending on the process conditions, a common vapor removal for all subspaces also may be provided in the case of separation of the concentrates through the subdivision of the separating space.

Even in the case of subdivision into subspaces, in each case the arrangement of a collecting funnel in each subspace may be effective for promoting the separation of vapor and concentrate.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A thin film evaporating device comprises a housing having a sidewall, a top wall and a bottom wall, said sidewall, top wall and bottom wall together defining a space; a plurality of elongated tubes located within said space and extending from said top wall to said bottom wall; shaft means having a plurality of radially extending vanes rotatably mounted within each of said plurality of elongated tubes; feed inlet means and withdrawal outlet means associated with each of said plurality of elongated tubes for feeding product to be concentrated to said tubes and removing concentrate and vapor from said tubes; separating means downstream of said withdrawal outlet means and at least one collection means in said separating means for receiving said concentrate and vapor; first and second means associated with said separating means for removing said concentrate and said vapor respectively; and means for feeding a flowable heating medium to and from said space for heating said plurality of tubes; at least one partition subdividing the separating means into a plurality of separate subspace means each receiving concentrate and vapor from one of said plurality of tubes, each of said subspace means has a first outlet and a second outlet above the first outlet and wherein the first outlet of one of the subspace means from one of the tubes is communicated with the inlet of another of said plurality of tubes so as to connect the plurality of elongated tubes in series.

2. A thin film evaporting device according to claim 1 wherein the side wall is cylindrical.

3. A thin film evaporating device according to claim 1 wherein said withdrawal outlet means communicates with the at least one collection means comprising at least one collecting funnel inserted into the separating means.

4. A thin film evaporating device according to claim 1 wherein each feed inlet means to the elongated tubes is provided with a shut-off valve.

5. A thin film evaporating device according to claim 4 wherein an adjustable pressure holding valve is associated with each feed inlet means for each elongated tube.

* * * * *